US012663937B2

(12) United States Patent

Scott et al.

(10) Patent No.: US 12,663,937 B2
(45) Date of Patent: Jun. 23, 2026

(54) METHODS AND APPARATUS FOR DATA PREPROCESSING

(71) Applicant: The United States of America, as represented by the Secretary of the Navy, Crane, IN (US)

(72) Inventors: Alicia Scott, Bloomington, IN (US); Eli Phillips, Springville, IN (US); Logan Hedge, Bloomington, IN (US); Joseph Cesena, Norco, CA (US); James Michael McDonough, Ventura, CA (US); Stephanie Pham, Norco, CA (US); Nathalie Jesenia Huerta, Santa Clara, CA (US); Jared Sarabia, Thousand Oaks, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 249 days.

(21) Appl. No.: 17/729,707

(22) Filed: Apr. 26, 2022

(65) Prior Publication Data

US 2022/0342583 A1 Oct. 27, 2022

Related U.S. Application Data

(60) Provisional application No. 63/179,682, filed on Apr. 26, 2021.

(51) Int. Cl.
*G06N 20/00* (2019.01)
*G06F 3/00* (2006.01)
(Continued)

(52) U.S. Cl.
CPC .......... *G06F 3/0652* (2013.01); *G06F 3/0604* (2013.01); *G06F 3/0641* (2013.01);
(Continued)

(58) Field of Classification Search
CPC .... G06F 3/0652; G06F 3/0604; G06F 3/0641; G06F 3/0673; G06F 16/90344; G06F 16/16; G06N 20/00
(Continued)

(56) References Cited

U.S. PATENT DOCUMENTS 8,190,538 B2 * 5/2012 Zhang ............... G06F 16/90344
706/12
2010/0063799 A1 * 3/2010 Jamieson ............... G06F 16/36
704/10

(Continued)

FOREIGN PATENT DOCUMENTS

WO WO 2009052277 A1 * 4/2009
WO WO 2018031051 A1 * 2/2018
WO WO 2021047866 A1 * 3/2021

OTHER PUBLICATIONS

Dapeng Dong et al., "Content-Aware Partial Compression for Textual Big Data Analysis in Hadoop", IEEE Transactions on Big Data ( vol. 4, Issue: 4, Dec. 1, 2018), pp. 459-472.*

*Primary Examiner* — Srirama Channavajjala
(74) *Attorney, Agent, or Firm* — Naval Surface Warfare Center, Crane Division; Patrick B. Law

(57) ABSTRACT

Methods, apparatus, and/or computer program products for data preprocessing are provided. The invention utilizes selective modular processes that automate data cleaning tasks and provide an initial analysis of datasets using, among other things, Natural Language Processing and Machine Learning methods. The apparatus and methods preprocess text data, clean database data with minimal human intervention, and provide automatic analytical results that include basic data cleaning, spell check, clustering, outlier detection, and natural language processing. Each modular process can be selectively switched on or off based on user input, preprogrammed instructions, or AI inputs. Addition- (Continued)

ally, any data format may be input as the apparatus and methods are data agnostic and, therefore, are not designed specifically for one type of data or theme of data. The inventive apparatus and methods dramatically reduce preparation time on the front end of data projects.

15 Claims, 6 Drawing Sheets

(51) Int. Cl.

| | |
|---|---|
| *G06F 3/06* | (2006.01) |
| *G06F 16/16* | (2019.01) |
| *G06F 16/903* | (2019.01) |

(52) U.S. Cl.
CPC ............ *G06F 3/0673* (2013.01); *G06F 16/16* (2019.01); *G06F 16/90344* (2019.01); *G06N 20/00* (2019.01)

(58) Field of Classification Search
USPC .......................................................... 707/692
See application file for complete search history.

(56) References Cited

U.S. PATENT DOCUMENTS

| | | | | |
|---|---|---|---|---|
| 2014/0298098 A1* | 10/2014 | Poghosyan | ......... | G06F 11/3452 |
| | | | | 714/37 |
| 2018/0052823 A1* | 2/2018 | Scally | ................... | G06F 40/284 |
| 2020/0242350 A1* | 7/2020 | Burgess | ............... | G06F 40/279 |
| 2020/0410335 A1* | 12/2020 | Gu | ........................ | G06V 10/776 |
| 2021/0230981 A1* | 7/2021 | Gupta | ................... | G06Q 10/04 |
| 2021/0342836 A1* | 11/2021 | Cella | .................... | H04L 9/3239 |
| 2021/0357800 A1* | 11/2021 | Sharma | ................. | G06N 20/00 |
| 2022/0051479 A1* | 2/2022 | Agarwal | ............. | G06N 3/0475 |
| 2022/0067102 A1* | 3/2022 | Sen | .......................... | G06N 5/02 |
| 2022/0130127 A1* | 4/2022 | Zhang | ................... | G06F 30/27 |
| 2022/0198562 A1* | 6/2022 | Cella | .................... | G06Q 40/04 |

* cited by examiner

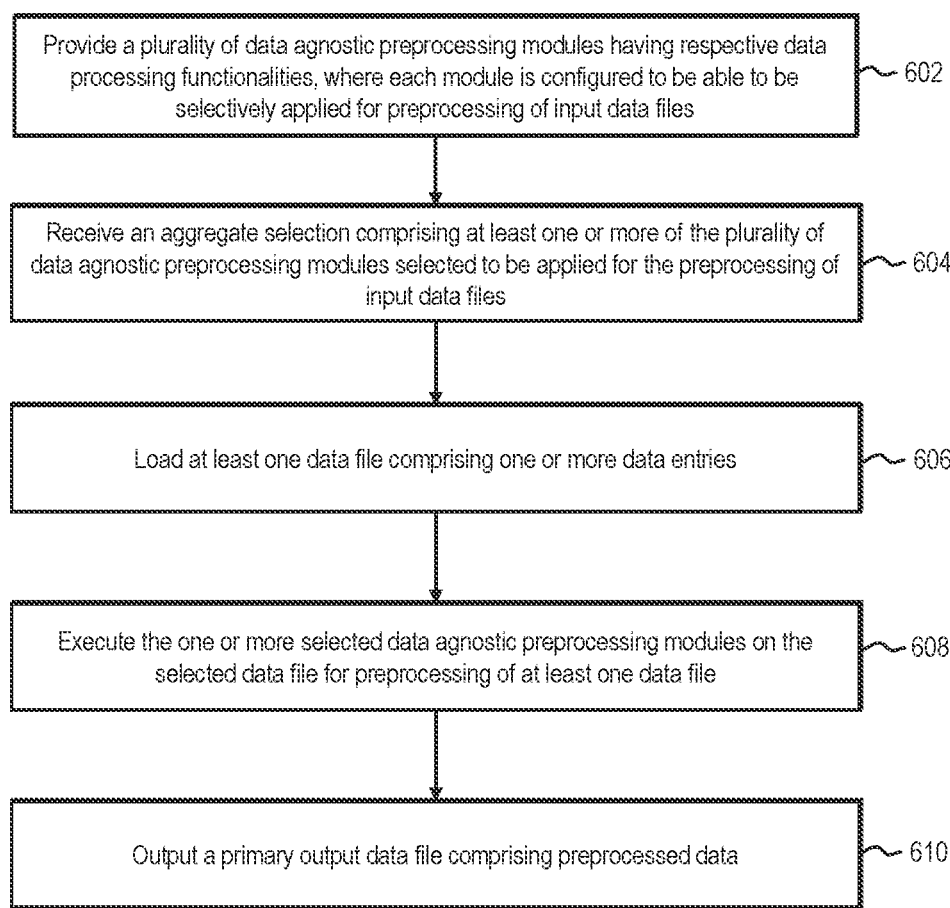

600

Provide a plurality of data agnostic preprocessing modules having respective data processing functionalities, where each module is configured to be able to be selectively applied for preprocessing of input data files — 602

Receive an aggregate selection comprising at least one or more of the plurality of data agnostic preprocessing modules selected to be applied for the preprocessing of input data files — 604

Load at least one data file comprising one or more data entries — 606

Execute the one or more selected data agnostic preprocessing modules on the selected data file for preprocessing of at least one data file — 608

Output a primary output data file comprising preprocessed data — 610

*FIG. 6*

METHODS AND APPARATUS FOR DATA PREPROCESSING

CROSS-REFERENCE TO RELATED APPLICATIONS

The present application claims the benefit of and priority to U.S. Provisional Patent Application Ser No. 63/179,682, filed Apr. 26, 2021, entitled "DATA PREPROCESSING AND METHODS THEREOF," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210,132US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD

The field of the present disclosure relates generally to data cleaning. More particularly, the present disclosure pertains to data preprocessing that automates data cleaning tasks and provides cleaned data that can be more efficiently parsed and analyzed by a machine, for example.

BACKGROUND

The amount of raw data generated on a daily basis is increasing at a staggering rate. It is estimated that by 2025 the world will be generating approximately 463 Exabytes of data per day. Oftentimes, raw data is inaccurate, incomplete, or inconsistent. As can be appreciated by those skilled in the art, entering such raw data into a machine for analysis prior to careful screening for such problems can produce incorrect and misleading results. Therefore, data must be cleaned before it can be accurately parsed and analyzed. Data cleaning, which can involve removing outliers, filling in missing values, smoothing noisy data, and correcting inconsistent data, is often performed with data preprocessing (DPP). DPP is a data mining technique that involves converting raw data into an understandable format that can be parsed and analyzed by a machine. The product of DPP is a final training set. DPP, however, is often done manually, taking up to 80% of the total time spent on a data project, as an example. As such, an automated method of performing DPP with minimal human input that also allows for various types of data (i.e., data agnostic) would be beneficial for dramatically reducing preparation time on the front end of data projects.

SUMMARY

The present disclosure relates to methods, apparatus, and computer program products for DPP that automate data cleaning tasks and provide an initial analysis of datasets using Natural Language Processing (NLP) and Machine Learning (ML) methods, for example. The inventive methods and apparatus use a modular module that can preprocess text data and clean database data with minimal human intervention, as well as give automatic analytical results that include basic data cleaning, spell checking, clustering, outlier detection, and natural language processing tools. Each module/process can be selectively applied, such as through means of a graphical user interface (GUI). The present methods and apparatus allow a user to input any data, such as data with comma separated value (CSV) data exchange format, as the present methods and apparatus are not designed specifically for any one type of data or theme of data. The present methods and apparatus perform data cleaning, data analytics, and artificial intelligence. These processes save much preparation time on the front end of data projects.

According to an illustrative embodiment of the present disclosure, it is an object of the invention to automate data cleaning tasks and provide an initial analysis of datasets using Natural Language Processing (NLP) and Machine Learning methods.

According to a further illustrative embodiment of the present disclosure, it is an object of the invention to utilize various computing modules that can preprocess text data and clean database data with minimal human intervention as well as provide automatic analytical results that include data cleaning, spell check, clustering, outlier detection, and natural language processing tools.

According to a yet another illustrative embodiment of the present disclosure, it is an object of the invention to allow a user to input any type of data and is not limited specifically for any one type of data or theme of data.

Additional features and advantages of the present invention will become apparent to those skilled in the art upon consideration of the following detailed description of the illustrative embodiment exemplifying a best mode of carrying out the invention as presently perceived.

BRIEF DESCRIPTION OF THE DRAWINGS

The detailed description of the drawings particularly refers to the accompanying figures.

FIG. 6 shows a flow diagram of a method according to aspects of the present disclosure.

DETAILED DESCRIPTION

The embodiments of the invention described herein are not intended to be exhaustive or to limit the invention to precise forms disclosed. Rather, the embodiments selected for description have been chosen to enable one skilled in the art to practice the invention.

As mentioned above, preprocessing of data is often performed manually, which may take a significant amount of the total time spent on a project. The presently disclosed data preprocessing (DPP) reduces the time spent analyzing data and relieves the burden of cleaning and prepping data. This allows data to be processed at a much faster rate and more effectively than manual processing. The presently disclosed DPP also provides a holistic picture to the technical community that also provides support to the warfighter.

The present methods and apparatus afford the ability to selectively choose and combine a number of different DPP modules or processes. Furthermore, these modules or processes are implemented in an agnostic format that can be purposed to any dataset. Generally, the disclosed DPP tool containing the different DPP modules automates data cleaning tasks and provides an initial analysis of datasets using Natural Language Processing (NLP) and Machine Learning methods, as examples.

Figure 1:
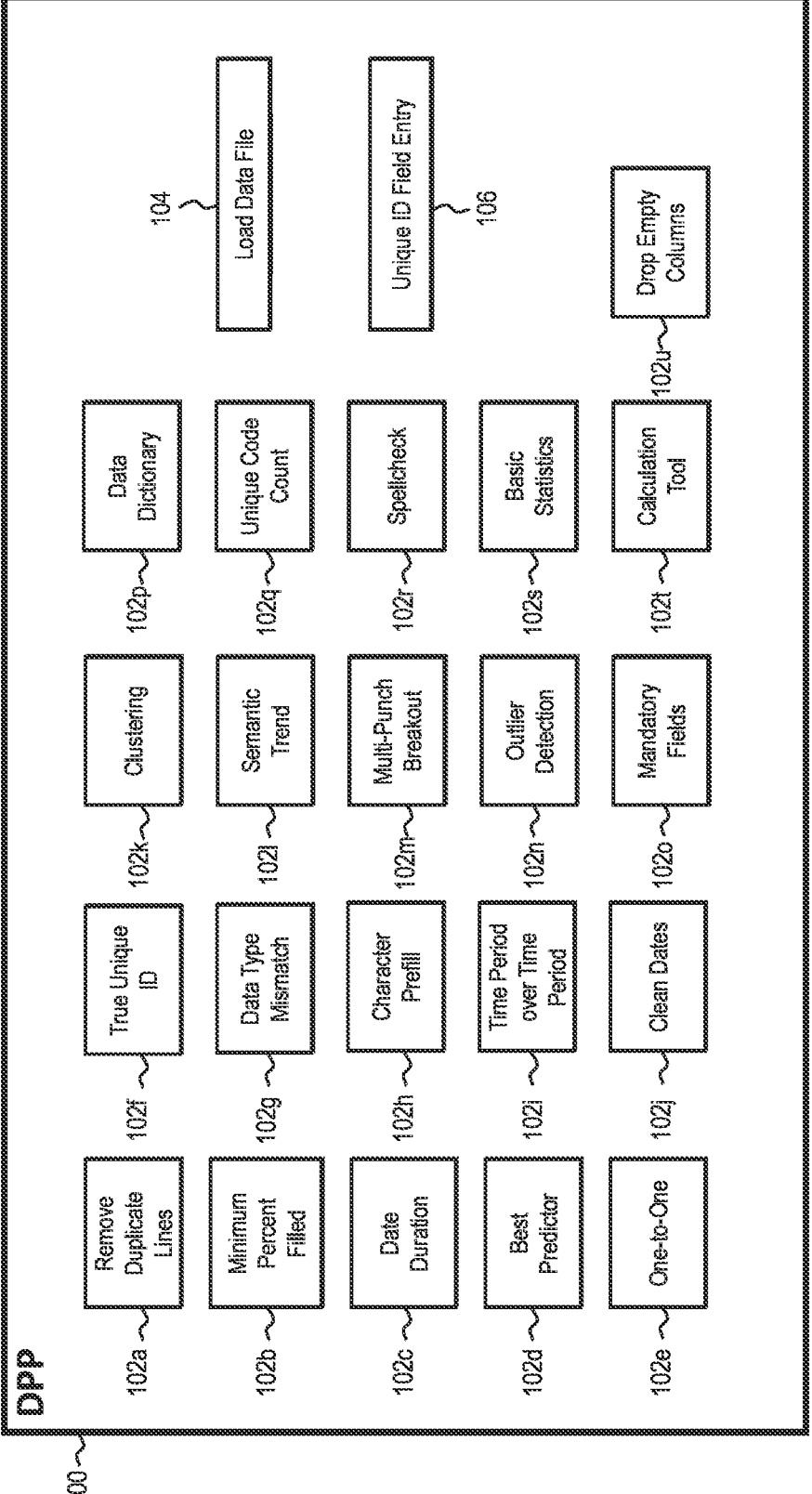
FIG. 1 shows a block diagram of different processes that are implemented and selectable for data preprocessing according to aspects of the present disclosure.

FIG. 1 shows a block diagram of an exemplary DPP tool or DPP processor 100 including a plurality of processes or modules 102 (e.g., illustrated as modules 102a-102u) that may be implemented and selectively applied for DPP according to aspects of the invention. In an aspect, a user may selectively apply the modules 102 (e.g., turn the modules on or off) via an input interface such as a graphical user interface (GUI), wherein the system allows for selectively defining which functions will be used in aggregate for data preprocessing. In other aspects, the modules 102 may be selected or applied using predetermined settings that may be loaded or input prior to operation or through artificial intelligence or machine learning (AI/ML). Of further note, each of modules 102 may be configured to be data agnostic preprocessing modules, meaning that they are able to handle various types of data and are not limited to one data format. Additionally, the system includes a module 104 to allow a user, for example, to select and load a data file (e.g., a CSV). Further, various ones or all of the modules 102 may be selected or chosen that is applied to the data.

Additionally, the DPP tool 100 may include a unique ID field entry 106 for the data, if desired or needed for certain of the functions or modules 102 (e.g., True Unique ID module 102f). Between each selection, a user can select either to run the processes 102 selected or add/subtract modules 102 to run. The system updates a working copy of the data where the processed data is kept and all of the detected inaccurate, incomplete, and inconsistent data is removed.

Table 1 lists some of the exemplary module or tools 102 and the associated libraries that may be imported before running the DPP tool or processes 100.

TABLE 1

| LIBRARIES IMPORTED BEFORE RUNNING DPP PROCESSES/TOOL | | | |
|---|---|---|---|
| MODULE | LIBRARIES | MODULES LINKED | CSV FILE NEEDED |
| REMOVE DUPLICATE LINES (102a) | Pandas | | |
| TRUE UNIQUE ID (102f) | Pandas | | |
| CLEAN DATES (102j) | Pandas | | |
| DATE DURATION (102c) | Pandas | | |
| MULTI-PUNCH BREAKOUT (102m) | Pandas | | |
| MANDATORY FIELDS (102o) | Pandas, Numpy | | |
| MINIMUM PERCENT FILLED (102b) | Pandas, Numpy | | |
| DATA TYPE MISMATCH (102g) | Pandas | | |
| UNIQUE CODE COUNT (102q) | Pandas, Matplotlib | | |
| DATA DICTIONARY (102p) | Pandas | | WORDMAP.CSV |
| SPELLCHECK (102r) | Pandas, NLTK, difflib | Need to run True Unique ID before running Spellcheck. | DICTIONARY.CSV |
| CLUSTERING/KMEANS (102k) | matplotlib, pandas, sklearn, numpy | Need to run True Unique ID before running Outlier Detection. | |
| OUTLIER DETECTION (102n) | matplotlib, pandas, sklearn, numpy | | |
| BASIC STATISTICS (102s) | pandas | | |
| CALCULATION TOOL (102t) | pandas, numpy | | |
| TIME PERIOD OVER TIME PERIOD (102i) | pandas, matplotlib | | |
| ONE-TO-ONE (102e) | pandas, numpy | | |

TABLE 1-continued

| LIBRARIES IMPORTED BEFORE RUNNING DPP PROCESSES/TOOL | | | |
| --- | --- | --- | --- |
| MODULE | LIBRARIES | MODULES LINKED | CSV FILE NEEDED |
| CHARACTER PREFILL (102h) | pandas | | |
| SEMANTIC TREND (102l) | PyLDAvis, gensim, pandas | | |
| BEST PREDICTOR (102d) | pandas, sklearn | | |

Figure 2:
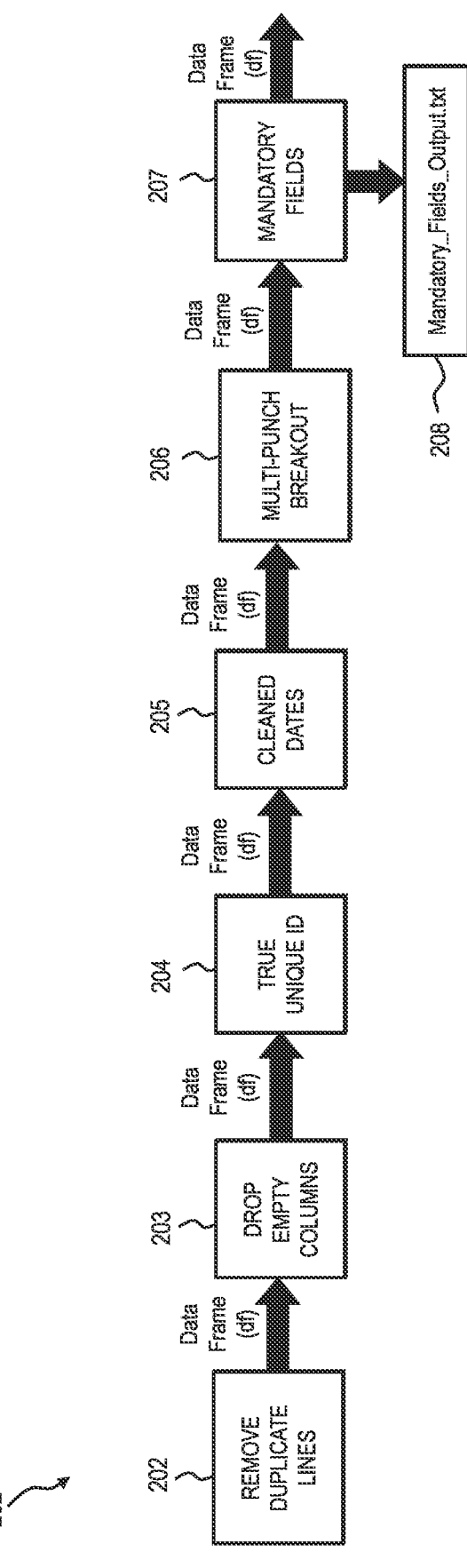
FIG. 2 shows an overview of process steps for an exemplary system according to aspects of the present disclosure.

FIG. 2 shows a flow diagram 200 of an exemplary first set of processes from among the modules or processes 102. At 202, the Remove Duplicate Lines module (e.g., 102a in FIG. 1) deletes lines that are identical across all fields, leaving one instance of a record. The system updates the working copy of the data where the first instance of the record is kept and outputs a CSV file (indicated also as data frame df) where all other duplicate rows have been removed from the dataset. At 203, a Drop Empty Columns module (e.g., 102u) removes columns that are completely empty. The system updates the working copy of the data and outputs a CSV file where all empty columns have been removed from the dataset. At 204, the True Unique ID module (e.g., 102t) causes the system to return a CSV file where the modules have been executed depending on a user's selection(s). The file name output may be "OriginalFileName_processed.csv." Any features that output a separate file for the user to view, such as an analysis or error file, may be named "DPP_featureName.csv."

At 205, a Cleaned Dates module (e.g., 102j) conforms all dates in a user designated column to one date format that is consistent. The system returns the working copy of the data where a new column will be inserted with the date conventions based on a user's selection, for example, which may include numerical and/or non-numerical date formats. Examples of formatting may be "dd/mm/yyyy," "dd/mm/yyyy," "Mon/dd/yyyy," or "dd/Mon/yyyy."

At 206, a Multi-Punch Breakout module (e.g., 102m) takes in a user designated column name and a delimiting character, then breaks the column apart by the character. From the resulting list, this module appends a new column for each item in the list that is useful for analysis involving the presence of these items. This is used to break up data in a list format into multiple columns. For example, if column data is inputted like "M105; Q347; H329 new columns will be created for each of the values based on the ";" semicolon as the delimiter. In other aspects, a user may input the desired delimiter including commas (,), semicolons (;), quotes (" "), braces ({ }), pipes (|), slashes (/ \), or spaces. In aspects, the Multi-Punch Breakout module alters a user's .csv file, which will include new column(s) that the user requested and separates that column by using the delimiter the user requested. An additional csv file may be created containing the original data.

At 207, a Mandatory columns or fields module (e.g., 102o) returns an xml (i.e., MS Excel) file or similar database or spreadsheet type file with a percentage of missing information and a total of rows missing mandatory fields. In one example, the Mandatory Columns module or fields module allows a user to select "All" if all the columns in the user's csv file are mandatory. Additionally, the mandatory fields module may be configured to generate and output a Mandatory_Fields_Output.txt text file as shown at 208 in FIG. 2.

Figure 3:
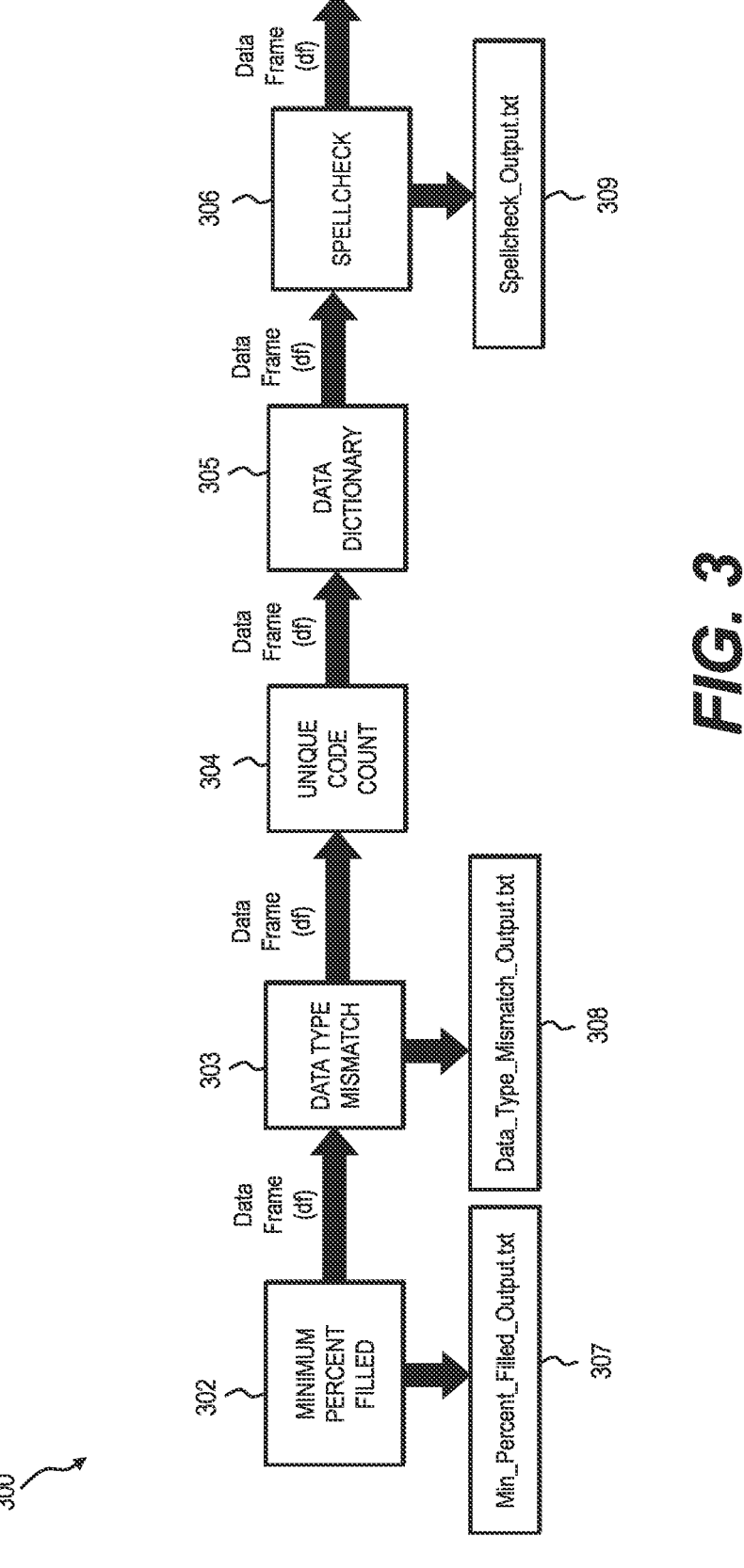
FIG. 3 shows an overview of further process steps for an exemplary system according to aspects of the present disclosure.

FIG. 3 shows a flow 300 of an exemplary second set of process steps or modules for an exemplary system. At 302, a Minimum Percent Filled module (e.g., module 102b) checks if each of the columns are filled to a user defined percentage. If a column is not filled to the defined percentage, then a column header is added to a list that is returned to the user for review. The system alters the working copying of the data where columns that are missing data are converted to Not a Number (NaN). Finally, the module can also delete the columns that do not meet the threshold in some aspects. Moreover, the minimum percent filled module may output a text file with the minimum percent filled as shown at 307.

At 303, a Data Type Mismatch module (e.g., 102g) changes a user specified column to a data type requested by the user, presenting an error if the column cannot be changed. Further, the module may be configured to write a file telling the user the percent make up of each column in terms of data types. In particular, the module may generate or create a .txt file named "data type mismatch.txt" as shown at 308. This file defines the data type class for each column in the data frame. The module also provides the percentage of each data type class.

At 304, the Unique Code Count module (e.g., 102q) returns a count of the unique values from a user selected column. If the column contains lists, this function splits each list on a user selected delimiter, then returns a count of the unique values. The user can input the desired column for analysis, along with the desired delimiter, and creates a .txt file named "Unique_Code_Count_Output." This file contains a count of the unique values of the user's desired column. In some aspects, a user may input the desired delimiter (e.g., commas (,), semicolon (;), quotes (", '), braces ({ }), pipes (|), slashes (/ \), or space).

At 305, a data dictionary module (e.g., module 102p) normalizes text fields within the data by replacing all variations and acronyms of a word or set of words with a single word or set of words. This feature takes in a user file structured in a predefined format, then alters the working copying of the data by replacing all variations and acronyms with a word(s) as defined by a loaded data dictionary. In some aspects, a user may load their dictionary (e.g., a dictionary.csv file) before running this module. Finally in FIG. 3, at 306 a Spellcheck module (e.g., 102r) identifies and fixes basic typographical errors within text cells. The module 306 is configured to identify typos within a specified cell in a provided column and returns a text file providing suggestions for possible misspelled words that were in the CSV file as shown at 309.

Figure 4:
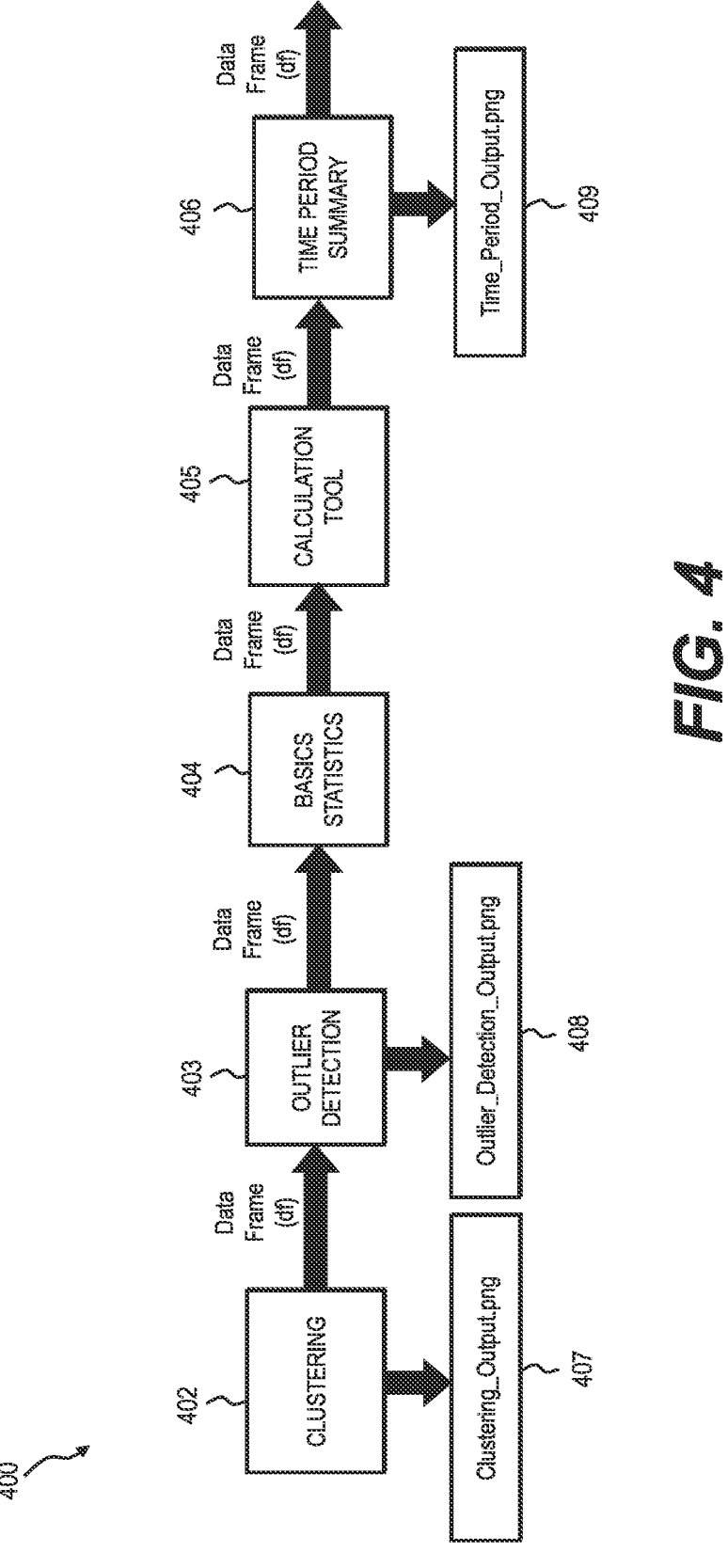
FIG. 4 shows an overview of still further process steps for an exemplary system according to aspects of the present disclosure.

FIG. 4 shows an exemplary flow 400 of further process steps or modules of the present system. At 402, a clustering module (e.g., 102k) analyzes the dataset via a k-means clustering module and a machine learning (ML) model that links similar records into clusters. In further operation module 402 returns an image where a user's data has been fitted into clusters and assigns the clusters to the closest centroid. The module 402 identifies outliers in each cluster for further analysis and alters the working copy of the data where rows will be flagged as outliers in the furthest right column. This is accomplished by calculating the average length for every point within the cluster to the centroid, and defining the points in the cluster that fall outside the average length as outliers. The module also outputs several images where the user's data has been grouped into clusters as shown at 407, for example. In a further aspect, module 402 affords the ability for a user to select a desired number of clusters.

At 403, an Outlier Detection module (e.g., 102n) identifies records with values that are outliers for user-selected columns, and returns a printout of the values with occurrences sorted least to greatest, potential outliers at different stages of the module, and a chart of occurrences of those values such as is shown at 408. The module 403 may run a density-based spatial clustering of applications with noise (DBSCAN) operation on the data in one aspect. In other aspects, a String/Cell/Date Analysis may be implemented where a user selects the type of analysis output, which returns print outs of the values with occurrences sorted least to greatest, potential outliers at different stages of the module, and a chart of occurrences of those values.

At 404, a Basic Statistics module (e.g., 102s) is configured to calculate the 25th percentile, mean, and 75th percentile value, median, mode, and standard deviation of all numeric columns. The module creates a database or spreadsheet file (e.g., Excel) workbook named "Statistic Calculations.xlsx", which includes the statistic calculations for all numeric columns of data present in the file. For a mode calculation, in particular, if the data is multi-modal, the module 404 may be configured to display up to five (5) modes. If the data has six (6) different modes, then for that specific column the module will display "More than 5 modes," for example.

At 405, a Calculation module (e.g., 102t) calculates basic operations of columns with multiplication, division, addition, and subtraction. Additionally, a user may select how many columns will be calculated column wise and enters the columns headers and the operation, as well as the arithmetic (e.g., user inputs the arithmetic calculation (e.g. addition (+), subtraction (−), multiplication (*), and/or division (/)). In some aspects, the module 405 alters a working copy of the data, creating a column named 'total" with a user's inputted header name and operation. The calculations are performed column-wise.

At 406, a Time Period Summary module (e.g., 102i) plots values of a user designated column in either a month over month or year over year graph, given that the dataset has dates for every record. The module 406 returns a graph such as shown at 409 as one example where the x-axis is the date field the user entered and the y-axis is the sum of the column for the specific dates in the data when datatype is numeric. If data is non-numeric, the module is configured to display individual bar graphs for the designated column the user entered and the count. Graphs can be saved in the working copy.

Figure 5:
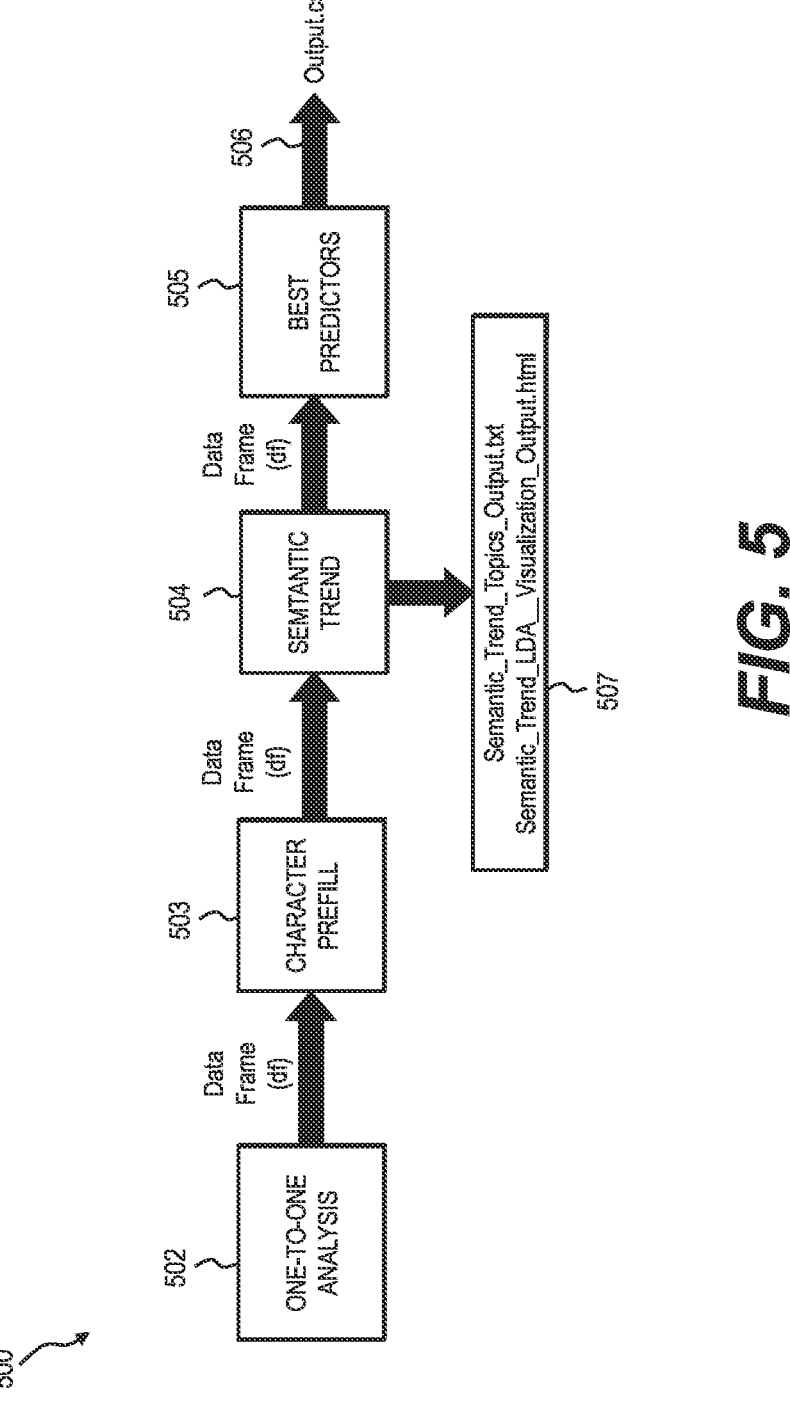
FIG. 5 shows an overview of yet further process steps for an exemplary system according to aspects of the present disclosure.

FIG. 5 shows an exemplary flow 500 of yet further process steps or modules of the present system. At 502, a One to One Analysis module (e.g., 102e) checks whether values of one user selected column correspond to only one value of another user selected column. If so, a '.txt' file named "One_to_One_Output" is created, which indicates that the specified column corresponds to only one value and that the file is clean. If the value does not correspond to only one value, then the file will indicate to the user an error and that the rule has been violated, and which column(s) violates the rule. In further aspects, a user's csv file will not be altered.

At 503, a Character Prefill module (e.g., 102h) prepends a user selected character to all the values in a column a varied number of times, normalizing the length of the values to a user selected length. If a value is longer than the user selected length, the code returns an output file. In an aspect, a user may be allowed to select a desired column that will prepend the user's desired characters based on the expected length of the selected column. Additionally, the module 502 may alter the working copy of the data with the user's desired column that has been prepended with the desired character/s. The column will be prepended until the expected length has been filled. If the length of the certain rows is greater than the expected length, then this row will be appended to the data frame. This data frame may also be printed for the user.

At 504, a Semantic Trend module (e.g., 102l) is configured to identify the main points of individual records and discern general trends of the dataset. The module 504 returns two files. The first file shown at 507 is "DPP_Semantic_Trend_Topics," and may be a text file that displays the number topics and the words associated to those topics. The topics will vary depending on a user's input. The second file also shown at 507, which may be termed "Semantic_Trend_LDA_Visualization", is a visual representation of the user's data and the words associated by topic.

At 505, a Best Predictors module (e.g., 102d) selects the fields that have a higher correlation to a user designated field. The module 505 provides a list of selected fields in a CSV file that may be termed "Best Predictors Linear Regression.csv" containing the best predictors for the users selected column, the P-values for those columns, and the adjusted R-squared value for all numeric columns.

Other modules may include a date duration or date differences module (e.g., 102c) that appends a column of date differences between two user designated columns. In this case, a user selects two date columns they want to use to create a new column with the date duration between each date. This module then alters a working copying of the data desired csv file, which will include a new column, where Column 2 is subtracted from Column 1 (i.e. Column 2−Column 1) to obtain the date duration. The new column is added to the working copying of the data.

Additionally, a time period over time period module such as 102i may plot values of a user designated column in either a month over month or year over year graph, given the dataset has dates for every record. Here, a user may select types of desired date fields and columns for analysis and selects whether the analysis will be year over year or month over month. This module may return a graph where the x-axis is the date field the user entered and the y-axis is the sum of that column for the specific dates in the data, when data_type is numeric. If data_type is non-numeric, module 102i will display individual bar graphs for the designated column the user entered and the count. The non-numeric graphics will also print out a list with the counts. Graphs are saved in the file that the data was selected from.

FIG. 6 illustrates a flow diagram of an exemplary method 600 operable with the present apparatus or system (e.g., system 100). As shown, block 602 the method 600 includes providing a plurality of data agnostic preprocessing modules having respective data processing functionalities, where each module is configured to be able to be selectively applied for preprocessing of input data files. Further, method 600 includes receiving an aggregate selection comprising at least one or more of the plurality of data agnostic preprocessing modules selected to be applied for the preprocessing of input data files as shown at block 604. Additionally, method 600 includes loading at least one data file comprising one or more data entries as shown at block 606.

After block 606, method 600 includes executing the one or more selected data agnostic preprocessing modules on the selected data file for preprocessing of at least one data file as shown at block 608. In a further, alternative aspect, block 608 may include wherein one of the one or more data agnostic preprocessing modules are further configured to utilize Natural Language Processing and Machine Learning to perform a data preprocessing function to the at least one data file. Finally, method 600 includes outputting a primary output data file comprising preprocessed data. This primary output data file is a data preprocessed file that is produced by the automation processes of the various modules discussed herein, as an example.

Additionally, method 600 may include importing a plurality of libraries before executing the one or more selected data agnostic preprocessing modules as was discussed previously. Method 600 also may include that the plurality of data agnostic preprocessing modules include remove duplicate lines, drop empty columns, true unique ID, cleaned dates, multi-punch breakout, mandatory fields, minimum percent filled, data type mismatch, unique code count, data dictionary, spell check, clustering, outlier detection, basic statistics, calculation tool, time period summary, one to one analysis, character prefill, semantic trend, and best predictors modules. In some aspects, the remove duplicate lines module deletes lines that are identical across all fields, leaving one instance of a record; the true unique ID module returns a CSV file when the module has been executed; the drop empty columns module removes columns that are completely empty; the cleaned dates module conforms all dates in a designated column to one format; the multi-punch breakout module takes a designated column name and a delimiting character and breaks the column apart by the character; the mandatory fields module returns a file with the percentage of missing information and the total of rows missing; the minimum percent filled module checks if all column are filled to a defined percentage; the data type mismatch module writes a file indicating the percent make up of each column in terms of data types; the unique code count module returns a count of the unique values from a selected column; the data dictionary module normalizes text fields within the data by replacing all variations and acronyms of a word or set of words with a single word or set of words; the spell check module identifies and fixes basic typographical errors within text cells; the clustering module analyzes the dataset via a k-means clustering module and a machine learning model that links similar records in clusters; the outlier detection module identifies records with values that are outliers for selected columns and returns a printout of the values with occurrences sorted least to greatest, potential outliers at different stages of the module, and a chart of occurrences of those values; the basic statistics module calculates the 25th percentile, mean, and 75th percentile value, median, mode, and standard deviation of all numeric columns; the calculation tool module calculates basic operations of columns with multiplication, division, addition, and subtraction; the time period summary module plots values of a designated column in either a month over month or year over year graph, given that the dataset has dates for every record; the one to one analysis module checks that values of one selected column corresponds to only one value of another selected column; the character prefill module prepends a selected character to all values in a column a varied number of times, normalizing the length of the values to a user selected length; the semantic trend module identifies main points of individual records, discerning general trends of the dataset; and the best predictors module selects fields that have a higher correlation to a designated field. Various modules of the DPP 100, for example, may utilized natural language processing (NLP) and/or machine learning (ML) or artificial intelligence (AI) in performance of the operations thereof.

Although the invention has been described in detail with reference to certain preferred embodiments, variations and modifications exist within the spirit and scope of the invention as described and defined in the following claims.

The invention claimed is:

1. A method of data preprocessing comprising:
   providing a plurality of data agnostic preprocessing modules within a data preprocessing processor each of the plurality of data agnostic preprocessing modules having respective data processing functionalities, where each module is configured to be able to be selectively applied for preprocessing of input text data files and allow input and processing of a plurality of types of text data;

receiving, with the data preprocessing processor via a graphical user interface (GUI), an aggregate selection data for selecting which of the plurality of data preprocessing modules are to be applied for data preprocessing, the aggregate selection data comprising a selection of at least one or more of the plurality of data agnostic preprocessing modules to be applied for the preprocessing of input text data files;

loading at least one input data file with the data preprocessing processor, the at least one input text data file comprising one or more data entries;

executing the one or more selected data agnostic preprocessing modules with the data preprocessing processor based on the received aggregate selection data on the at least one input text data file for preprocessing of the at least one input text data file, wherein at least one of the one or more data agnostic preprocessing modules are further configured to utilize computer-Implemented Natural Language Processing and Machine Learning to perform a data preprocessing function on the at least one input data file; and outputting with the data preprocessing processor a primary output data file comprising preprocessed data resulting from the execution of the one or more selected data agnostic preprocessing modules on the at least one input text data file.

2. The method of claim 1, further comprising importing a plurality of libraries before executing the one or more selected data agnostic preprocessing modules.

3. The method of claim 1, wherein the plurality of data agnostic preprocessing modules include remove duplicate lines, drop empty columns, true unique ID, cleaned dates, multi-punch breakout, mandatory fields, minimum percent filled, data type mismatch, unique code count, data dictionary, spell check, clustering, outlier detection, basic statistics, calculation tool, time period summary, one to one analysis, character prefill, semantic trend, and best predictors modules.

4. The method of claim 3, wherein the remove duplicate lines module deletes lines that are identical across all fields, leaving one instance of a record;

wherein the true unique ID module returns a CSV file when the module has been executed;

wherein the drop empty columns module removes columns that are completely empty;

wherein the cleaned dates module conforms all dates in a designated column to one format;

wherein the multi-punch breakout module takes a designated column name and a delimiting character and breaks the column apart by the character;

wherein the mandatory fields module returns a file with the percentage of missing information and the total of rows missing;

wherein the minimum percent filled module checks if all columns are filled to a defined percentage;

wherein the data type mismatch module writes a file indicating the percent make up of each column in terms of data types;

wherein the unique code count module returns a count of the unique values from a selected column;

wherein the data dictionary module normalizes text fields within the data by replacing all variations and acronyms of a word or set of words with a single word or set of words;

wherein the spell check module identifies and fixes basic typographical errors within text cells;

wherein the clustering module analyzes the dataset via a k-means clustering module and a machine learning model that links similar records in clusters;

wherein the outlier detection module identifies records with values that are outliers for selected columns and returns a printout of the values with occurrences sorted least to greatest, potential outliers at different stages of the module, and a chart of occurrences of those values;

wherein the basic statistics module calculates the 25th percentile, mean, and 75th percentile value, median, mode, and standard deviation of all numeric columns;

wherein the calculation tool module calculates basic operations of columns with multiplication, division, addition, and subtraction;

wherein the time period summary module plots values of a designated column in either a month over month or year over year graph, given that the dataset has dates for every record;

wherein the one to one analysis module checks that values of one selected column corresponds to only one value of another selected column;

wherein the character prefill module prepends a selected character to all values in a column a varied number of times, normalizing the length of the values to a user selected length;

wherein the semantic trend module identifies main points of individual records for discerning general trends of the dataset; and wherein the best predictors module selects fields that have a higher correlation to a designated field.

5. The method of claim 1, wherein the at least one of the one or more data agnostic preprocessing modules configured to utilize Machine Learning includes a clustering module that analyzes the at least one input text data file using a k-means clustering module and a machine learning model that links similar records into clusters, returns at least one image where data has been fitted into clusters, and assigns the clusters to a closest centroid.

6. A data preprocessing apparatus comprising:

a non-transitory computer-readable medium with instructions thereon; and one or more processors, when executing the instructions, configured to:

provide a plurality of data agnostic preprocessing modules with a data preprocessing processor implemented by the one or more processors, each of the plurality of data agnostic preprocessing modules having respective data processing functionalities, where each module is configured to be able to be selectively applied for preprocessing of input text data files and allow input and processing of a plurality of types of data;

execute a graphical user interface with the data preprocessing processor to receive an aggregate selection data for selecting which of the plurality of data preprocessing modules are to be applied for data preprocessing, the aggregate selection data comprising a selection of at least one or more of the plurality of data agnostic preprocessing modules selected to be applied for the preprocessing of input text data files;

load at least one input text data file with the data preprocessing processor, the at least one input text data file comprising one or more data entries;

execute the one or more selected data agnostic preprocessing modules with the data preprocessing processor based on the received aggregate selection data on the at least one input text data file for preprocessing of the at least one input text data file, wherein at least one of the one or more data agnostic preprocessing modules are further configured to utilize computer-implemented Natural Language Processing and Machine Learning to perform a data preprocessing function on the at least one input text data file; and output with the data preprocessing processor a primary output data file comprising preprocessed data resulting from the execution of the one or more selected data agnostic preprocessing modules on the at least one input text data file.

7. The apparatus of claim 6, further comprising importing a plurality of libraries before executing the modules.

8. The apparatus of claim 6, wherein the plurality of data agnostic preprocessing modules include remove duplicate lines, drop empty columns, true unique ID, cleaned dates, multi-punch breakout, mandatory fields, minimum percent filled, data type mismatch, unique code count, data dictionary, spell check, clustering, outlier detection, basic statistics, calculation tool, time period summary, one to one analysis, character prefill, semantic trend, and best predictors modules.

9. The apparatus of claim 8, wherein the remove duplicate lines module deletes lines that are identical across all fields, leaving one instance of a record;

wherein the true unique ID module returns a CSV file when the module has been executed;

wherein the drop empty columns module removes columns that are completely empty;

wherein the cleaned dates module conforms all dates in a designated column to one format;

wherein the multi-punch breakout module takes a designated column name and a delimiting character and breaks the column apart by the character;

wherein the mandatory fields module returns a file with the percentage of missing information and the total of rows missing;

wherein the minimum percent filled module checks if all columns are filled to a defined percentage;

wherein the data type mismatch module writes a file indicating the percent make up of each column in terms of data types;

wherein the unique code count module returns a count of the unique values from a selected column;

wherein the data dictionary module normalizes text fields within the data by replacing all variations and acronyms of a word or set of words with a single word or set of words;

wherein the spell check module identifies and fixes basic typographical errors within text cells;

wherein the clustering module analyzes the dataset via a k-means clustering module and a machine learning model that links similar records in clusters;

wherein the outlier detection module identifies records with values that are outliers for selected columns and returns a printout of the values with occurrences sorted least to greatest, potential outliers at different stages of the module, and a chart of occurrences of those values;

wherein the basic statistics module calculates the 25th percentile, mean, and 75th percentile value, median, mode, and standard deviation of all numeric columns;

wherein the calculation tool module calculates basic operations of columns with multiplication, division, addition, and subtraction;

wherein the time period summary module plots values of a designated column in either a month over month or year over year graph, given that the dataset has dates for every record;

wherein the one to one analysis module checks that values of one selected column corresponds to only one value of another selected column;

wherein the character prefill module prepends a selected character to all values in a column a varied number of times, normalizing the length of the values to a user selected length;

wherein the semantic trend module identifies main points of individual records for discerning general trends of the dataset; and wherein the best predictors module selects fields that have a higher correlation to a designated field.

10. The data preprocessing apparatus of claim 6, wherein the at least one of the one or more data agnostic preprocessing modules configured to utilize Machine Learning includes a clustering module that analyzes the at least one input text data file using a k-means clustering module and a machine learning model that links similar records into clusters, returns at least one image where data has been fitted into clusters, and assigns the clusters to a closest centroid.

11. A computer program product comprising a non-transitory computer-readable storage medium containing computer program code, the computer program code when executed by one or more processors causes the one or more processors to perform operations, the computer program code comprising instructions to:

provide a plurality of data agnostic preprocessing modules with a data preprocessing processor implemented by the one or more processors, each of the plurality of data agnostic preprocessing modules having respective data processing functionalities, where each module is configured to be able to be selectively applied for preprocessing of input text data files and allow input and processing of a plurality of types of data;

execute a graphical user interface with the data preprocessing processor to receive an aggregate selection data for selecting which of the plurality of data preprocessing modules are to be applied for data preprocessing, the aggregate selection data comprising a selection of at least one or more of the plurality of data agnostic preprocessing modules selected to be applied for the preprocessing of input text data files;

load at least one input text data file comprising one or more data entries;

execute the one or more selected data agnostic preprocessing modules with the data preprocessing processor based on the received aggregate selection data on the at least one input text data file for preprocessing of the at least one input text data file, wherein at least one of the one or more data agnostic preprocessing modules are further configured to utilize computer-implemented Natural Language Processing and Machine Learning to perform a data preprocessing function on the at least one input text data file; and output with the data preprocessing processor a primary output data file comprising preprocessed data resulting from the execution of the one or more selected data agnostic preprocessing modules on the at least one input text data file.

12. The computer program product of claim 11, further comprising instructions to import a plurality of libraries before executing the modules.

13. The computer program product of claim 11, wherein the modules comprise remove duplicate lines, drop empty columns, true unique ID, cleaned dates, multi-punch breakout, mandatory fields, minimum percent filled, data type mismatch, unique code count, data dictionary, spell check, clustering, outlier detection, basic statistics, calculation tool, time period summary, one to one analysis, character prefill, semantic trend, and best predictors modules.

14. The computer program product of claim 13, wherein the remove duplicate lines module deletes lines that are identical across all fields, leaving one instance of a record;

wherein the true unique ID module returns a CSV file when the module has been executed;

wherein the drop empty columns module removes columns that are completely empty, wherein the cleaned dates module conforms all dates in a designated column to one format;

wherein the multi-punch breakout module takes a designated column name and a delimiting character and breaks the column apart by the character;

wherein the mandatory fields module returns a file with the percentage of missing information and the total of rows missing;

wherein the minimum percent filled module checks if all columns are filled to a defined percentage;

wherein the data type mismatch module writes a file indicating the percent make up of each column in terms of data types;

wherein the unique code count module returns a count of the unique values from a selected column;

wherein the data dictionary module normalizes text fields within the data by replacing all variations and acronyms of a word or set of words with a single word or set of words;

wherein the spell check module identifies and fixes basic typographical errors within text cells;

wherein the clustering module analyzes the dataset via a k-means clustering module and a machine learning model that links similar records in clusters;

wherein the outlier detection module identifies records with values that are outliers for selected columns and returns a printout of the values with occurrences sorted least to greatest, potential outliers at different stages of the module, and a chart of occurrences of those values;

wherein the basic statistics module calculates the 25th percentile, mean, and 75th percentile value, median, mode, and standard deviation of all numeric columns;

wherein the calculation tool module calculates basic operations of columns with multiplication, division, addition, and subtraction;

wherein the time period summary module plots values of a designated column in either a month over month or year over year graph, given that the dataset has dates for every record;

wherein the one to one analysis module checks that values of one selected column corresponds to only one value of another selected column;

wherein the character prefill module prepends a selected character to all values in a column a varied number of times, normalizing the length of the values to a user selected length;

wherein the semantic trend module identifies main points of individual records for discerning general trends of the dataset; and wherein the best predictors module selects fields that have a higher correlation to a designated field.

15. The computer program product of claim 11, wherein the at least one of the one or more data agnostic preprocessing modules configured to utilize Machine Learning includes a clustering module that analyzes the at least one input text data file using a k-means clustering module and a machine learning model that links similar records into clusters, returns at least one image where data has been fitted into the clusters, and assigns the clusters to a closest centroid.

* * * * *